US012794709B2

(12) United States Patent
Ozawa et al.

(10) Patent No.: US 12,794,709 B2
(45) Date of Patent: Nov. 10, 2026

(54) DIGITAL CONTENT MANAGEMENT SYSTEM

(71) Applicant: Nomura Research Institute, Ltd., Tokyo (JP)

(72) Inventors: Kotaro Ozawa, Tokyo (JP); Kosuke Kawazu, Tokyo (JP); Nobuaki Kozuka, Tokyo (JP)

(73) Assignee: Nomura Research Institute, Ltd., Tokyo (JP)

( * ) Notice: Subject to any disclaimer, the term of this patent is extended or adjusted under 35 U.S.C. 154(b) by 21 days.

(21) Appl. No.: 19/088,449

(22) Filed: Mar. 24, 2025

(65) Prior Publication Data

US 2026/0246650 A1 Aug. 20, 2026

(30) Foreign Application Priority Data

Feb. 17, 2025 (JP) ................................ 2025-023507

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01)

(58) Field of Classification Search
CPC ............................ H04L 9/3247; H04L 9/0825
USPC .......................................................... 713/176
See application file for complete search history.

(56) References Cited

U.S. PATENT DOCUMENTS 8,352,743 B2 * 1/2013 Tsuruoka .............. G06F 21/445 713/176
10,581,597 B2 * 3/2020 Shen ................ G06K 19/06037
2010/0088519 A1 * 4/2010 Tsuruoka .............. H04L 9/3273 713/176

(Continued)

FOREIGN PATENT DOCUMENTS

CN 1829950 A 9/2006
CN 101657823 A 2/2010

(Continued)

OTHER PUBLICATIONS

Extended European Search Report (EESR) dated Dec. 2, 2025 for European patent application No. 25200776.0.

*Primary Examiner* — Teshome Hailu
(74) *Attorney, Agent, or Firm* — RANKIN, HILL & CLARK LLP

(57) ABSTRACT

Provided are: an actor verifiable attribute issuing unit that acquires attribute information regarding an actor, gives a first electronic signature to the attribute information, and issues the attribute information as a signed actor attribute; a content verifiable attribute issuing unit that acquires attribute information regarding content, gives a second electronic signature to the attribute information, and issues the attribute information as a signed content attribute; an actor identifier management unit that issues an actor identifier; and a content operation management unit that, upon a request to operate the content with information to which a third electronic signature is given, verifies the third electronic signature with a third public key, verifies the first electronic signature with a first public key, verifies the second electronic signature with a second public key, and determines satisfaction of a use condition for the content, based on the verified signed actor attribute and signed content attribute.

4 Claims, 10 Drawing Sheets

(56) References Cited

U.S. PATENT DOCUMENTS

2013/0318354 A1* 11/2013 Entschew ............. H04L 9/3247
713/175
2021/0028930 A1* 1/2021 Shen ..................... H04L 63/123

FOREIGN PATENT DOCUMENTS

JP 2004171090 A 6/2004
JP 5357292 B2 12/2013

* cited by examiner

DIGITAL CONTENT MANAGEMENT SYSTEM

BACKGROUND OF THE INVENTION

1. Technical Field

The present invention relates to a content management technique and particularly relates to a technique effective when applied to a digital content management system that manages diverse kinds of content including content only representing rights.

2. Description of the Related Art

With the recent progress of digitization, the role of digital content (hereinafter, sometimes simply referred to as "content") has been diversified. In conventional content, protection of content itself (prevention of unauthorized use, copy, falsification, and the like) centered on digital rights management (DRM) has been focused.

As a technique related to this, for example, Japanese Patent No. 5357292 describes a DRM engine that evaluates a license related to protected content in order to deduce whether or not access or other use of the requested content is authorized, and describes that the license includes a control program executable by the DRM engine.

SUMMARY OF THE INVENTION

According to the conventional technique, when digital content such as an image, a moving image, or music is created and distributed, it may be said that the content itself can be protected by giving a license to a specified user and authorizing and controlling use (including various types of operations on the content) to prevent unauthorized use, copy, falsification, and the like.

In such a conventional technique, rights of content and a user (mainly an owner of the content) will be managed at the same time. However, as described above, the role of digital content has been diversified, and for example, a ticket, a coupon, or the like, in which content itself has no meaning and merely represents rights, has also been used. In such content, since a variety of operations are made on the content by a variety of users (a user, a creator, an administrator, a seller, and so forth of the content), authority management, establishment of reliability with the users, and the like become complicated.

Thus, an object of the present invention is to provide a digital content management system capable of more flexibly and dynamically determining usage methods, conditions, and the like relating to variety of users even for diversified digital content. The above-mentioned and other objects and novel features of the present invention will become apparent from the description herein and the accompanying drawings.

A representative embodiment of the invention disclosed in the present application will be briefly outlined as follows.

A digital content management system that is a representative embodiment of the present invention includes: an actor verifiable attribute issuing unit that holds a pair of a first public key and a first private key, acquires attribute information regarding an actor, gives a first electronic signature to the acquired attribute information with the first private key, and issues the attribute information given the first electronic signature, as a signed actor attribute; a content verifiable attribute issuing unit that holds a pair of a second public key and a second private key, acquires attribute information regarding the digital content, gives a second electronic signature to the acquired attribute information with the second private key, and issues the attribute information given the second electronic signature, as a signed content attribute; and an actor identifier management unit that issues an actor identifier that identifies the actor, and a pair of a third public key and a third private key, and holds the signed actor attribute and the signed content attribute.

In addition, a content operation management unit is further provided that, upon a request to operate the digital content from the actor with information to which a third electronic signature has been given with the third private key and that includes the actor identifier, the third public key, the signed actor attribute, and the signed content attribute, verifies the third electronic signature with the third public key, verifies the first electronic signature given to the signed actor attribute with the first public key acquired from the actor verifiable attribute issuing unit, verifies the second electronic signature given to the signed content attribute with the second public key acquired from the content verifiable attribute issuing unit, and determines satisfaction of a use condition for the digital content, based on the verified signed actor attribute and signed content attribute.

An effect of the representative embodiment of the invention disclosed in the present application will be briefly described as follows.

That is, according to the representative embodiment of the present invention, usage methods, conditions, and the like relating to variety of users can be more flexibly and dynamically determined even for diversified digital content.

DETAILED DESCRIPTION

Hereinafter, embodiments of the present invention will be described in detail with reference to the accompanying drawings. In all the drawings for explaining the embodiments, the same portions are denoted by the same reference signs in principle, and duplicated descriptions thereof will be omitted. Meanwhile, a constituent part denoted by a reference sign in the description with reference to one drawing may be mentioned with the same reference sign denoted in the description with reference to other drawings in which the constituent part is not illustrated again.

Outline

As described above, the role of digital content has been diversified, and for example, in content such as a ticket or a coupon in which the content itself has no meaning and merely represents rights, a variety of operations are made by a variety of users, and thus authority management, establishment of reliability with the users, and the like become complicated.

Figure 2:
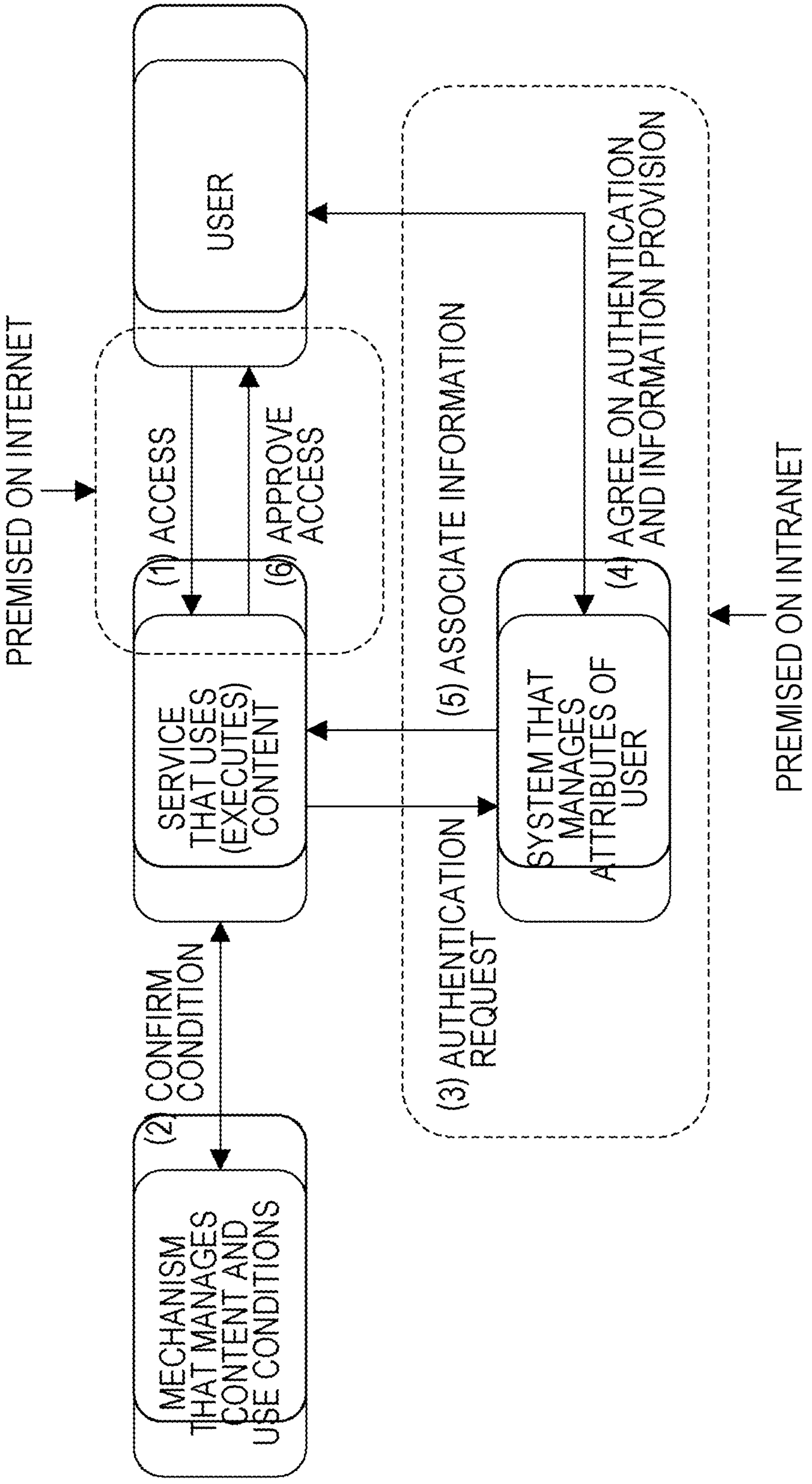
FIG. 2 is a diagram illustrating an outline of an example of a problem due to diversification of digital content.
Figure 3:
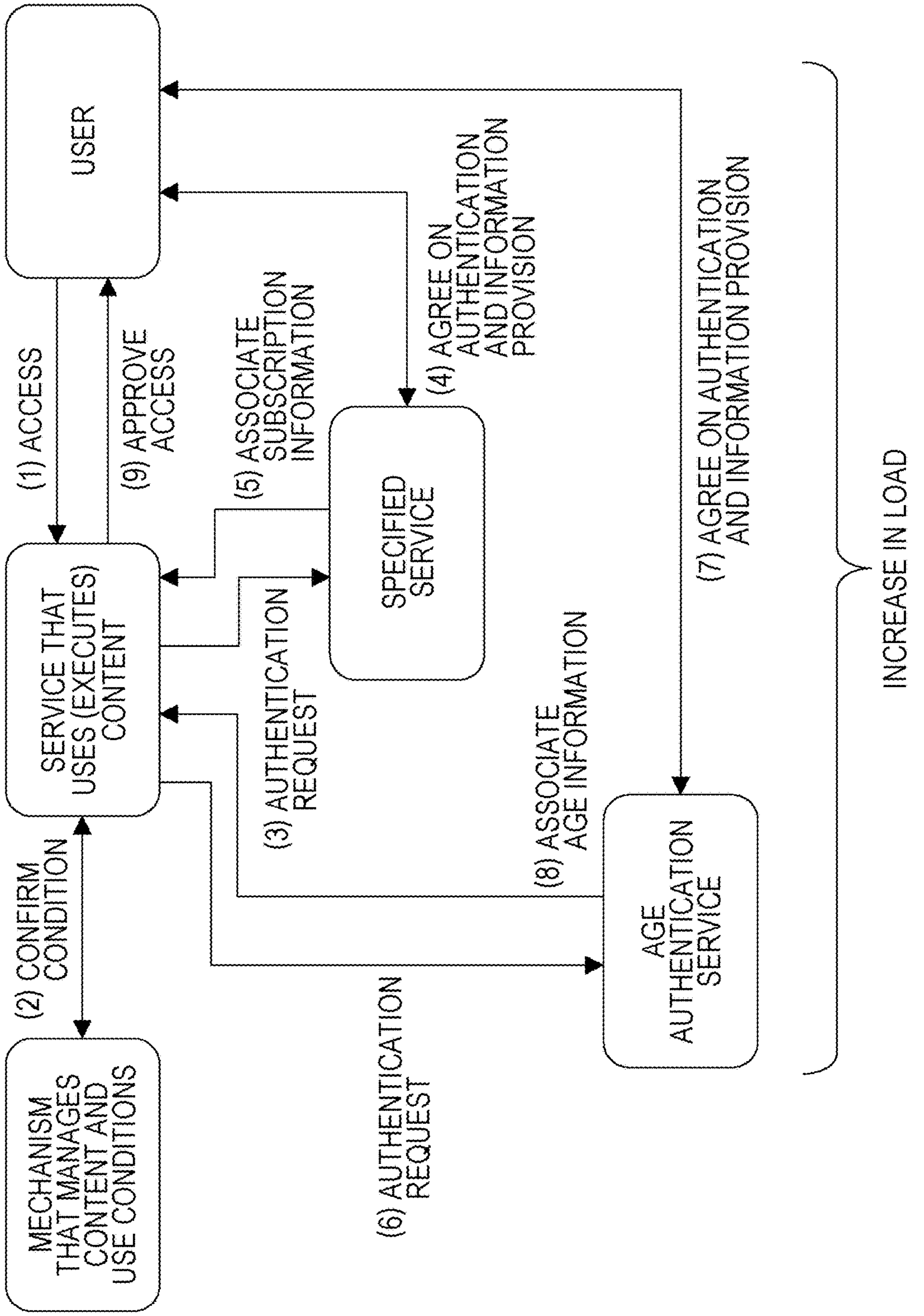
FIG. 3 is a diagram illustrating an outline of an example of a problem due to diversification of digital content.
Figure 4:
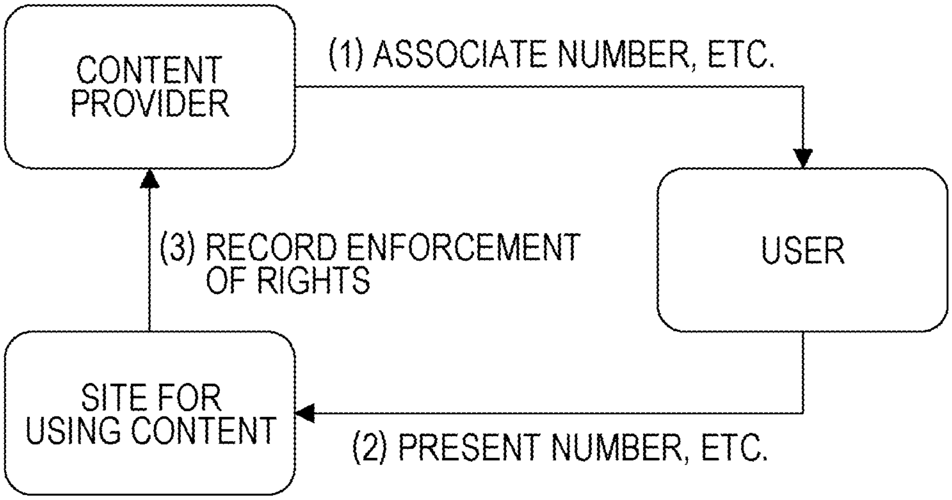
FIG. 4 is a diagram illustrating an outline of an example of a problem due to diversification of digital content.

FIGS. 2 to 4 are diagrams illustrating an outline of an example of problems due to diversification of digital content. Each drawing schematically illustrates a flow of a process and information when a user of content uses the content, and the example in FIG. 2 illustrates an example of a case where a condition that the user belongs to a specified company, school, or the like is designated as a condition for using the content.

In the example in FIG. 2, when the user accesses a service that uses (executes) the content (arrow (1) in the drawing), the accessed service confirms a use condition with a mechanism that manages the content and use conditions for the content (arrow (2) in the drawing). Then, in order to confirm whether the user meets the use conditions, an authentication request to acquire information is made to a system (for example, a system of the company or the school) that manages attributes of the user (arrow (3) in the drawing). In the requested system, the user is prompted to agree on authentication and information provision (arrow (4) in the drawing), and when the agreement is obtained, information (such as an employee number or a school student number, for example) on the user is responded and associated (arrow (5) in the drawing). In the service using the content, when it can be confirmed that the user belongs to the specified company, school, or the like, on the basis of the acquired information on the user, the user is approved to access the content (arrow (6) in the drawing).

In this manner, in a case where, for example, an external system (the company, school, or the like in the example in FIG. 2) has attribute information for examining a use condition of a service that uses the content, access to the service by a user (arrows (1) and (6) in the drawing) is premised on access via the Internet, whereas access to the external system by the service (arrows (3) and (5) in the drawing) is premised on access via an intranet. In such a case, there is a problem that restrictions on a network may arise, such as a difficulty in simultaneously satisfying network requirements relating to both the accesses.

The example in FIG. 3 illustrates an example of a case where there is a plurality of external systems having information for examining the use conditions for the content in a case similar to the example in FIG. 2 described above. For example, this case corresponds to a case where separate services manage information for examining each condition of combined conditions as the use conditions that, for example, the user uses a specified service and the age of the user is 18 years old or older.

Similarly to the example in FIG. 2, when the user accesses a service that uses (executes) the content (arrow (1) in the drawing), the accessed service confirms a use condition with a mechanism that manages the content and the use conditions for the content (arrow (2) in the drawing). Then, in order to confirm whether the user meets the use condition, first, an authentication request to acquire information is made to a specified service (arrow (3) in the drawing). In the requested specified service, the user is prompted to agree on authentication and information provision (arrow (4) in the drawing), and when the agreement is obtained, information (such as a user identifier (ID), for example) regarding whether or not the user has subscribed to the specified service is responded and associated (arrow (5) in FIG. 5).

In the service using the content, an authentication request to acquire information is further made to an age authentication service (arrow (6) in the drawing), and in the age authentication service, agreement relating to authentication and information provision is obtained from the user (arrow (7) in the drawing), and the age of the user is responded and associated (arrow (8) in the drawing). In the service using the content, when it can be confirmed that the user has subscribed to the specified service and the age of the user is 18 years old or older, the user is approved to access the content (arrow (9) in the drawing).

In this manner, in a case where the use conditions are combined and complicated, a plurality of external systems has information for examining each condition, and there is a problem that a load of incorporation for the purpose of accessing these external systems and a load of authentication and agreement operations of the user increase (arrows (3) to (8) in the drawing).

The example in FIG. 4 illustrates an example of a case where, for example, it is not checked who the user is, that is, the user is not managed on the content side as long as identification information such as a number and a barcode can only be input and displayed, such as a case where the content is an electronic ticket, a gift card, or a coupon.

The provider of the content associates information such as a number that identifies the content such as a ticket, with the user, and the user acquires the associated information (arrow (1) in the drawing). Thereafter, the user presents the acquired number or the like of the content to a site for using the content (arrow (2) in the drawing), and uses the content. That is, the rights represented by the content are enforced. At the site for using the content, the fact that the rights represented by the content have been exercised and have become used is recorded for the content provider (arrow (3) in the drawing).

In such a case, there is a problem that the content side is not allowed to examine whether or not the content has been distributed to the user as intended and has been used as intended, and as a result, unauthorized possession, unintended resale, or the like of the content may be admitted.

In order to cope with each problem as described above, a mechanism for more flexibly and dynamically determining usage methods, conditions, and the like relating to a variety of users (a user, a creator, an administrator, a seller, and so forth of the content) is expected.

In particular, it is desired to guarantee that information involved in examining a use condition when an operation on the content is admitted, such as an attribute or a state of a user, has not been illegally acquired or falsified, while maintaining interoperability. However, such a mechanism exceeds the coverage of the conventional DRM, and extension to the guarantee of the legitimacy of an attribute or a state of a user is expected as an interoperable mechanism. In addition, a scheme for managing ownership rights to content, such as a non-fungible token (NFT), has also appeared, and it is assumed that interoperation with a new scheme rather than between DRM mechanisms, and handling of free transaction not bound by a particular system will also be expected.

Thus, a digital content management system that is an embodiment of the present invention separately manages verifiable attributes for content and a variety of users (hereinafter, sometimes referred to as "actors") severally, thereby coping with every problem as described above and implementing flexible and interoperable use of content.

System Configuration

Figure 1:
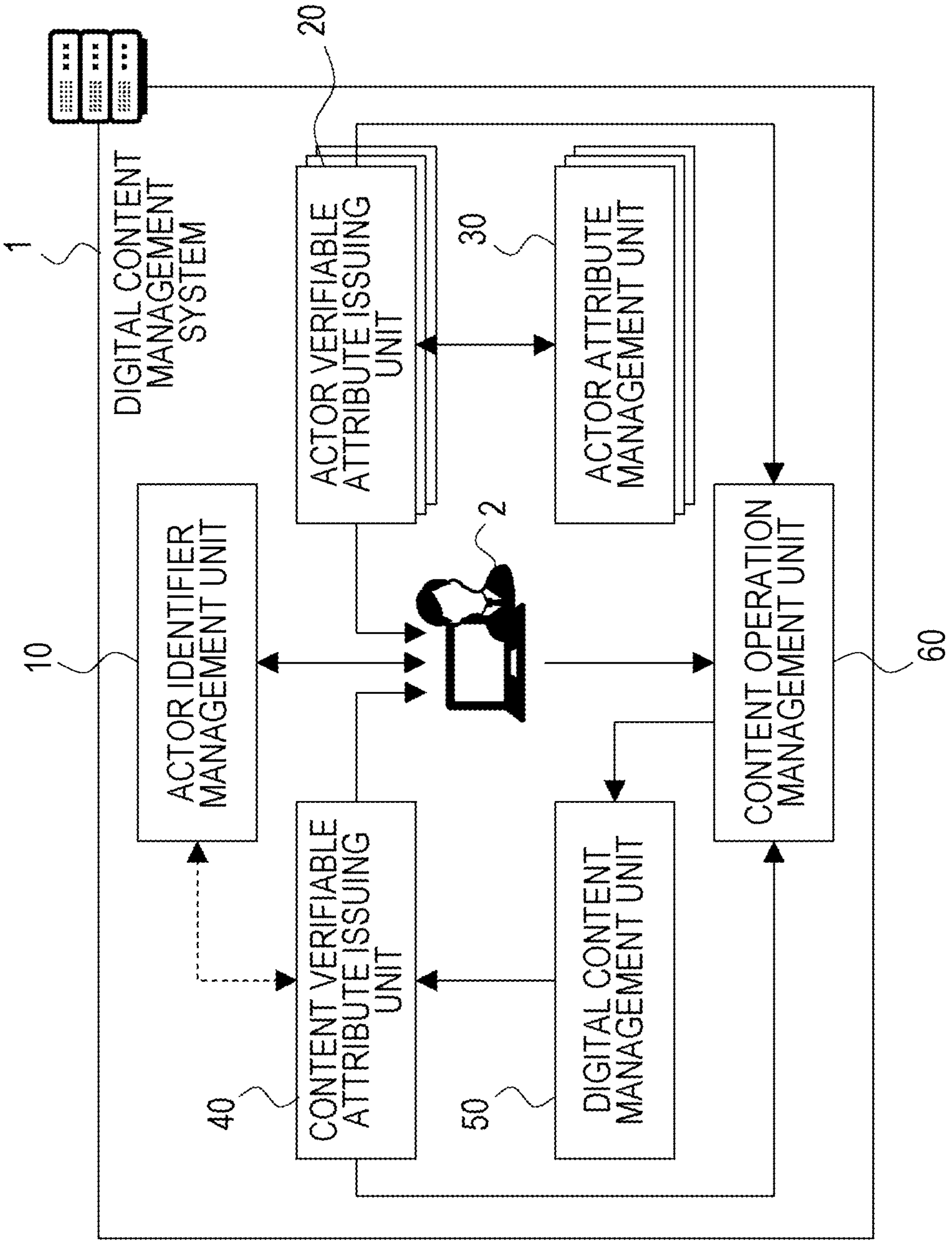
FIG. 1 is a diagram illustrating an outline of a configuration example of a digital content management system that is an embodiment of the present invention.

FIG. 1 is a diagram illustrating an outline of a configuration example of a digital content management system 1 that is an embodiment of the present invention. The digital content management system 1 is an information processing system that is constituted by, for example, one or more server devices, a virtual server built on a cloud computing service, an information processing terminal, or the like and implements flexible and interoperable use of content by executing, with a central processing unit (CPU) (not illustrated), an operating system (OS), a database management system (DBMS), and middleware such as a web server program loaded into a memory from a recording device such as a hard disk drive (HDD) or a solid state drive (SSD), and software that runs on the middleware.

The digital content management system 1 includes multiple units carried out as software, such as an actor identifier management unit 10, an actor verifiable attribute issuing unit 20, an actor attribute management unit 30, a content verifiable attribute issuing unit 40, a digital content management unit 50, and a content operation management unit 60, for example. Note that, in the example in FIG. 1, these multiple units are illustrated to integrally constitute the digital content management system 1, but the configuration is only logical. Physically, one or more of the multiple units may be configured as separate subsystems (which may be external systems), client-side applications, or the like and may be configured to cooperate with each other via a network (not illustrated).

The actor identifier management unit 10 has a function of an identity provider (IdP) that holds and manages information regarding an identifier (actor identifier) such as an ID that can be associated with an external service or the like for each actor 2, in a database or the like (not illustrated). This information includes, besides the actor identifier, a pair of a private key and a public key (an actor private key and an actor public key) for electronically signing and verifying the actor identifier. In addition, the actor identifier management unit 10 also has a function of acquiring and holding attribute information on the actor 2 and the content to be involved in examining conditions for when using or operating the content.

Note that, for convenience of illustration, the actor 2 is illustrated to belong to the digital content management system 1 in the example in FIG. 1, but the actor 2 is a user who uses the digital content management system 1 and accesses the digital content management system 1, using an information processing terminal such as a personal computer (PC), a tablet terminal, or a smartphone, for example. In addition, the information processing terminal includes, for example, a dedicated application, software such as a wallet, a web browser, or the like (not illustrated) for using and operating content via the digital content management system 1.

The actor verifiable attribute issuing unit 20 has a function of electronically signing the actor identifier and the actor public key prepared in advance by the actor 2 with the actor identifier management unit 10, and various types of attribute information (such as an employee number and age, for example) of the actor acquired from the actor attribute management unit 30 to be described later, thereby issuing the signed actor identifier and actor public key and verifiable attribute information, as attribute information (signed actor attribute). A pair of a private key and a public key (an actor issuer private key and an actor issuer public key) for electronic signature and verification is included and held in a database or the like (not illustrated). Note that the actor verifiable attribute issuing unit 20 can be provided for each relevant actor attribute.

The actor attribute management unit 30 has a function of holding and managing various types of attribute information regarding the actor, as well as responding with relevant attribute information in response to a request from the actor verifiable attribute issuing unit 20. The actor attribute management unit 30 may be an external system or service such as a system of a company or a school. The actor attribute management unit 30 can also be provided for each relevant actor attribute.

The content verifiable attribute issuing unit 40 has a function of electronically signing the actor identifier and the actor public key prepared in advance by the actor 2 with the actor identifier management unit 10, and attribute information (such as a ticket number that identifies content, for example) of the content acquired from the digital content management unit 50 to be described later, thereby issuing the signed actor identifier and actor public key and attribute information, as verifiable attribute information (signed content attribute). A pair of a private key and a public key (a content issuer private key and a content issuer public key) for electronic signature and verification is included and held in a database or the like (not illustrated).

The digital content management unit 50 has a function of holding and managing digital content such as a ticket, as well as accepting and executing an operation on the digital content. The digital content management unit 50 may be an external service or system such as a ticket agent. The content operation management unit 60 has a function of verifying the actor attribute and the content attribute to confirm the reliability of the information, upon a request from the actor 2 to use or operate the content, as well as examining a use condition for the content on the basis of the actor attribute and the content attribute for which the reliability has been confirmed, and using or operating the content via the digital content management unit 50 in a case where the condition is satisfied.

As in the configuration illustrated in the example in FIG. 1, by separating processes and functions between the actor side and the content side with the actor 2 as an axis, for example, it is possible to cope with a problem of restrictions relating to a difference in network requirements when the actor 2 accesses both sides, as illustrated in the example in FIG. 2 described above.

In addition, although details will be described later, since the actor verifiable attribute issuing unit 20 issues the signed actor attribute in advance, inquiry about and authentication of the actor attribute every time the content is used is no longer involved. This makes it possible to cope with a problem of complication and an increase in load caused by accessing a plurality of external systems in order to examine a use condition of the content, as illustrated in the example in FIG. 3 described above.

In addition, even in a case where the actor 2 is not reliable, the content operation management unit 60 can verify the actor attribute and the content attribute to confirm the reliability of the information and confirm that the actor 2 has appropriate authority. This makes it possible to cope with a problem that whether or not the content has been distributed to the user as intended and has been used as intended is not allowed to be examined, as illustrated in the example in FIG. 4 described above. Note that, by configuring the content operation management unit 60 to verify the actor attribute and the content attribute, as well as to examine the use condition of the content, the content usage management side is also allowed to, for example, set a use condition and extend the function of the content without changing the existing mechanism of the digital content.

Processing Flow (Overall)

Figure 5:
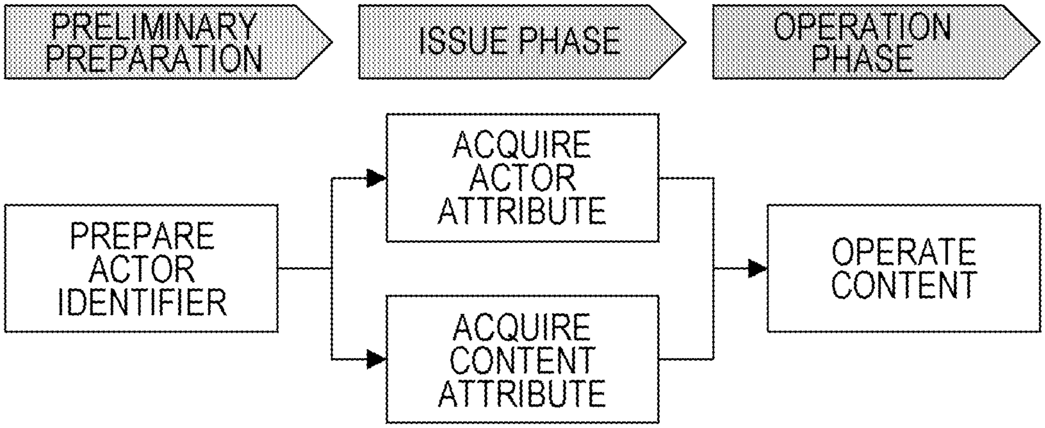
FIG. 5 is a diagram illustrating an outline of an example of an overall processing flow relating to use of or operation on content according to an embodiment of the present invention.

FIG. 5 is a diagram illustrating an outline of an example of an overall processing flow relating to use of or operation on content according to an embodiment of the present invention. First, as a preliminary preparation, the actor identifier is prepared. Here, the actor identifier management unit 10 prepares an actor identifier and a key pair (the actor private key and the actor public key) that can be associated with an external service or the like, for the actor 2.

Thereafter, acquisition of the actor attribute and acquisition of the content attribute are performed as an issue phase. In the acquisition of the actor attribute, (verifiable) attribute information on the actor 2 is acquired on the basis of the actor identifier of the actor 2. In addition, in the acquisition of the content attribute, (verifiable) attribute information on the content given to or usable by the actor 2 is acquired on the basis of the actor identifier of the actor 2. Thereafter, the content is operated as an operation phase. Here, the content is operated by presenting various types of actor attributes and content attributes acquired by the actor 2 in the issue phase.

Processing Flow (Preliminary Preparation)

Figure 6:
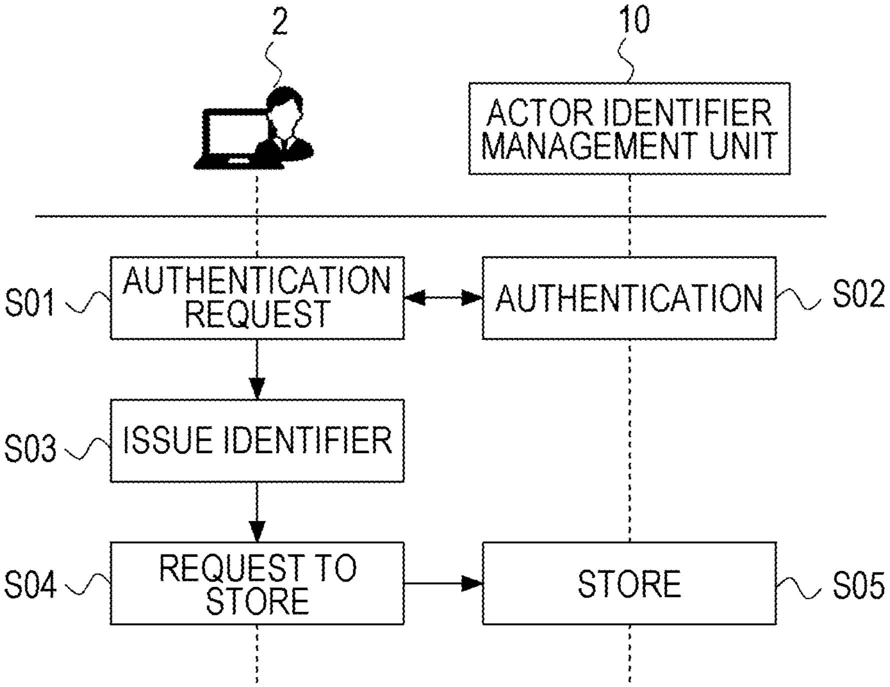
FIG. 6 is a diagram illustrating an outline of an exemplary flow of an actor identifier preparation process in a preliminary preparation according to an embodiment of the present invention.

FIG. 6 is a diagram illustrating an outline of an exemplary flow of an actor identifier preparation process in a preliminary preparation according to an embodiment of the present invention. First, the actor 2 who is an operator of the content makes an authentication request to the actor identifier management unit 10 with any ID that identifies the actor 2, via a predetermined application such as a wallet (S01), and the actor identifier management unit 10 performs a predetermined authentication process (S02). When authentication is performed, the actor 2 issues the actor identifier and a pair of the actor private key and the actor public key (S03) and requests the actor identifier management unit 10 to store and back up these actor identifier and pair of the actor private key and the actor public key (S04), and the actor identifier management unit 10 stores these actor identifier and pair of the actor private key and the actor public key (S05).

The actor identifier management unit 10 has a role as an IdP, but it is sufficient that a public key and a private key for electronic signature and verification are managed, and thus, any ID and key pair can be employed as the actor identifier and the actor private key and public key. In the present embodiment, for example, it is supposed that a decentralized identifier (DID) such as the Identity Overlay Network (ION) Long term is used as the actor identifier.

Processing Flow (Acquisition of Actor Attribute)

Figure 7:
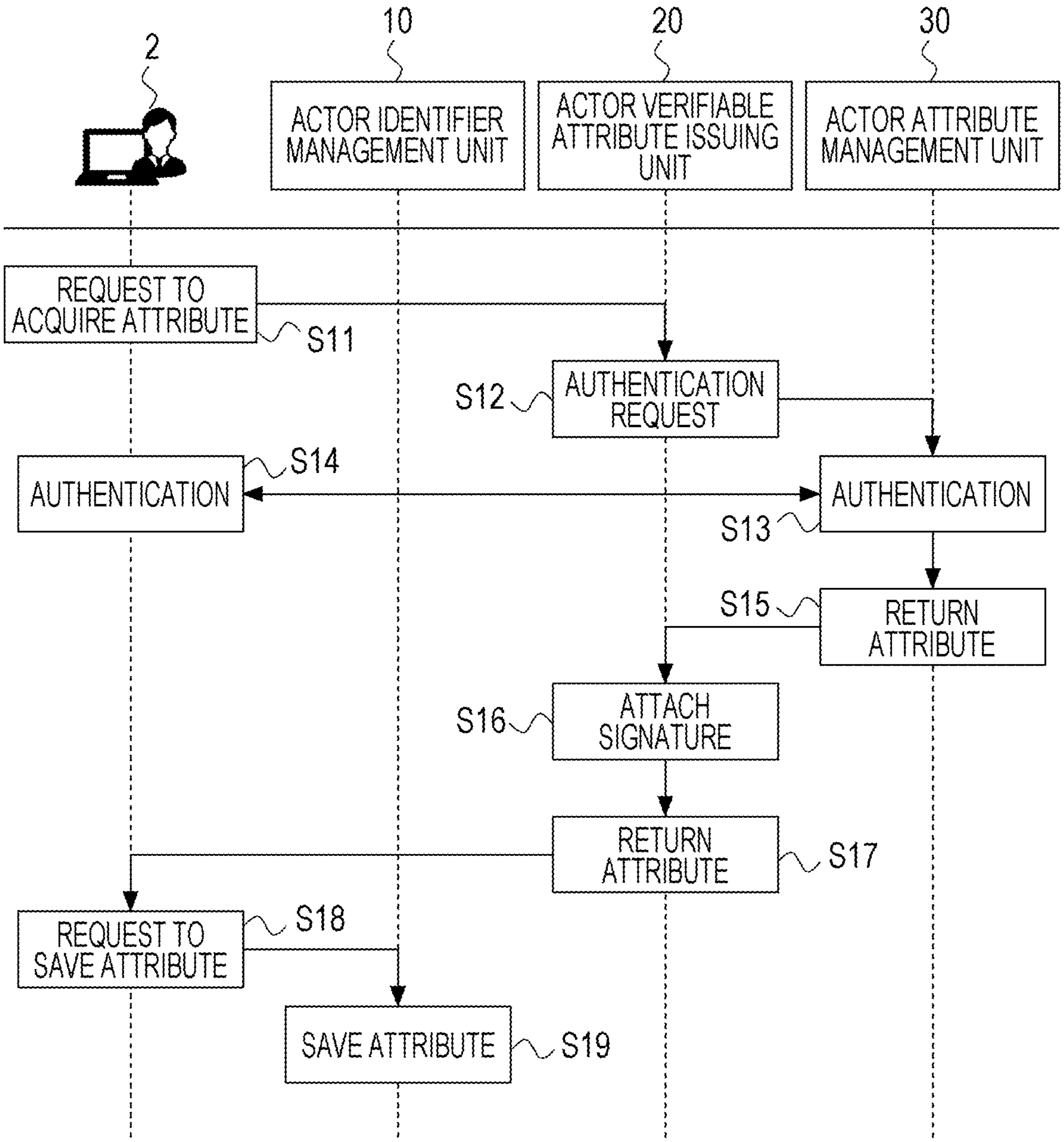
FIG. 7 is a diagram illustrating an outline of an exemplary flow of an actor attribute acquisition process in an issue phase according to an embodiment of the present invention.

FIG. 7 is a diagram illustrating an outline of an exemplary flow of an actor attribute acquisition process in the issue phase according to an embodiment of the present invention. First, the actor 2 requests the actor verifiable attribute issuing unit 20 to acquire the (verifiable) actor attribute of the actor 2 (S11). The request includes the actor identifier (DID) and the actor public key of the actor 2. The actor identifier itself may be formed to include the actor public key.

The actor verifiable attribute issuing unit 20 makes an authentication request to the actor attribute management unit 30 (S12), and the actor attribute management unit 30 performs an authentication process with the actor 2 (S13, S14). For example, the actor attribute management unit 30 prompts the actor 2 to input an employee number or the like and performs authentication on the basis of the employee number input by the actor 2. When the authentication is performed, the actor attribute management unit 30 returns information (such as the employee number, for example) on a predetermined actor attribute relating to the actor 2, to the actor verifiable attribute issuing unit 20 (S15).

The actor verifiable attribute issuing unit 20 attaches an electronic signature to an information set of the actor identifier (DID) and the actor public key acquired from the actor 2, and the actor attribute acquired from the actor attribute management unit 30, with the actor issuer private key held by the actor verifiable attribute issuing unit 20 (S16), and returns the signed information set to the actor 2 as a verifiable signed actor attribute (S17). This signed actor attribute is created, for example, in accordance with various types of standards related to verifiable credentials (VC). The above series of processes can be regarded as, for example, issuing a digital employee ID card in advance in a case where the actor attribute is the employee number.

The actor 2 that has acquired the signed actor attribute requests the actor identifier management unit 10 to save the acquired signed actor attribute (S18), and the actor identifier management unit 10 saves the passed signed actor attribute (S19). Note that the process illustrated in the example in FIG. 7 is performed for each actor attribute acquired in advance to use content.

Processing Flow (Acquisition of Content Attribute)

Figure 8:
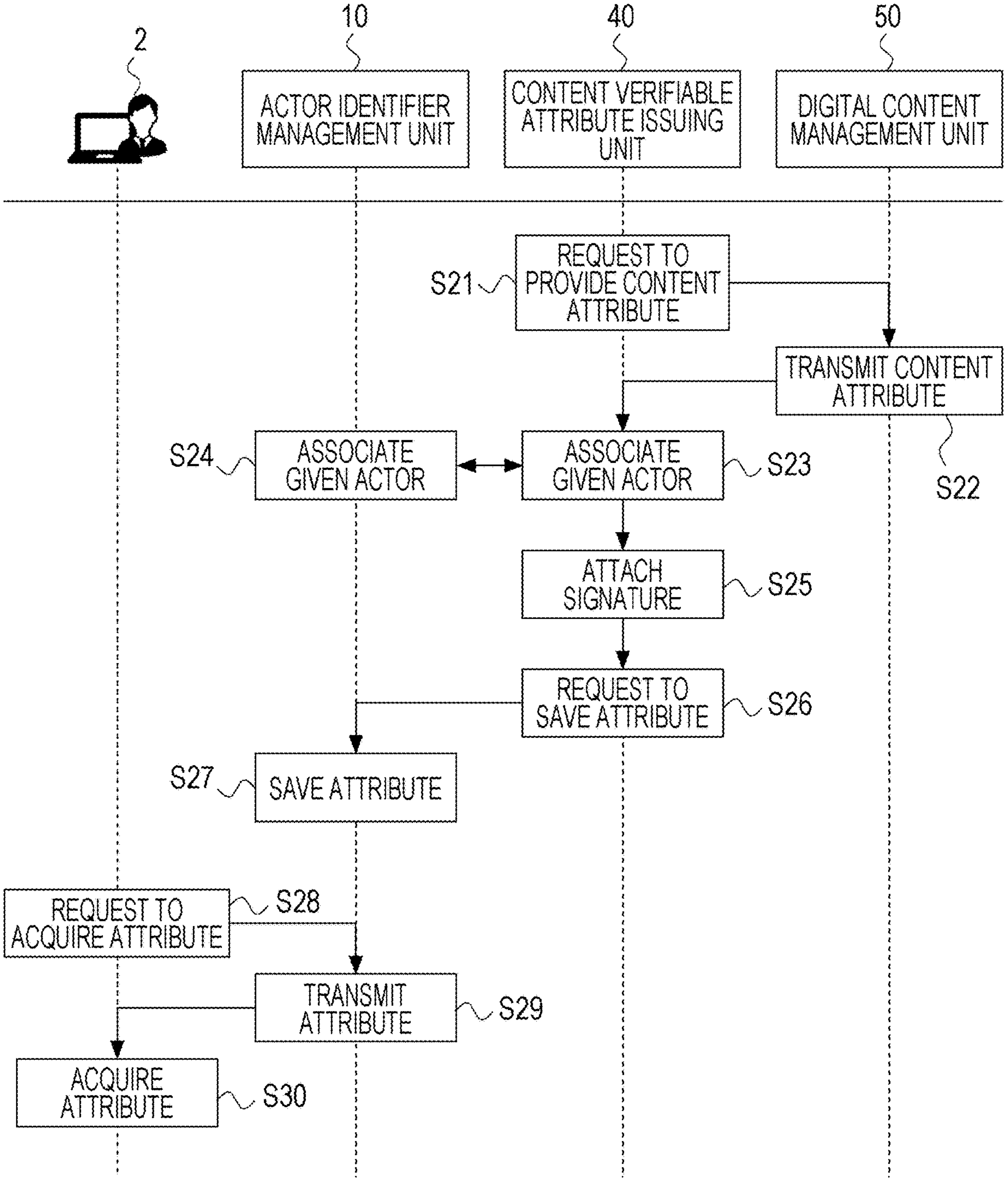
FIG. 8 is a diagram illustrating an outline of an exemplary flow of a content attribute acquisition process in the issue phase according to an embodiment of the present invention.

FIG. 8 is a diagram illustrating an outline of an exemplary flow of a content attribute acquisition process in the issue phase according to an embodiment of the present invention. FIG. 8 illustrates an exemplary flow of a process in a case where a list of actors 2 to which content attributes are to be given can be acquired and associated via a file or the like, such as a case where content such as tickets is collectively issued to a plurality of actors 2, and use of the content is permitted in advance.

First, the content verifiable attribute issuing unit 40 requests the digital content management unit 50 to provide the attribute information on the content (S21), and the digital content management unit 50 transmits the content attribute (such as a list of collectively issued ticket numbers, for example) (S22). Meanwhile, the content verifiable attribute issuing unit 40 cooperates with the actor identifier management unit 10 to acquire information on the actors 2 to which the content attribute is to be given (S23, S24). Here, for example, as described above, the information is acquired in the form of a file or the like in which the actors 2 to which the content attribute is to be given are listed. The acquired information on each actor 2 includes the actor identifier (DID) and the actor public key held by the actor identifier management unit 10.

Thereafter, the content verifiable attribute issuing unit 40 attaches an electronic signature to an information set of each actor identifier (DID) and actor public key acquired from the actor identifier management unit 10, and each content attribute (ticket number or the like) acquired from the digital content management unit 50, with the content issuer private key held by the content verifiable attribute issuing unit 40, and lists the signed information set as a verifiable signed content attribute (S25). Then, the actor identifier management unit 10 is requested to save the signed content attribute (S26), and the actor identifier management unit 10 saves the passed signed content attribute (S27). Note that the example in FIG. 8 depicts a configuration in which the actor identifier management unit 10 is located not in the terminal used by the actor 2 but in a server or the like.

Through the above process, each actor 2 is allowed to retrieve the content attribute with reference to the content attribute given to the actor 2. That is, the actor 2 requests the actor identifier management unit 10 to refer to and acquire the content attribute given to the actor 2 (S28), and the actor identifier management unit 10 transmits the requested content attribute to the actor 2 (S29), whereby the actor 2 can acquire the content attribute (S30).

Figure 9:
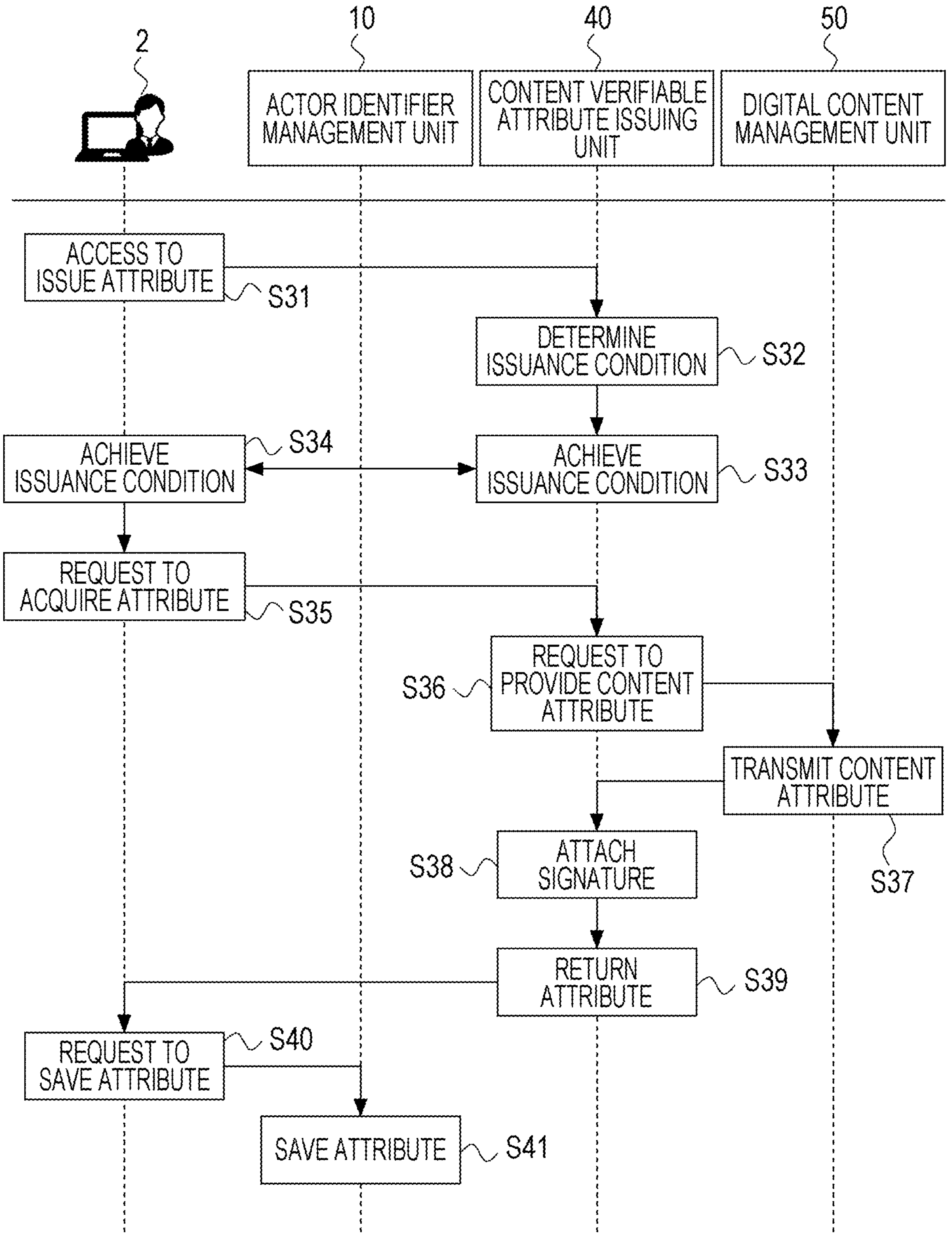
FIG. 9 is a diagram illustrating an outline of another exemplary flow of the content attribute acquisition process in the issue phase according to an embodiment of the present invention.

FIG. 9 is a diagram illustrating an outline of another exemplary flow of the content attribute acquisition process in the issue phase according to an embodiment of the present invention. Here, unlike the example in FIG. 8 described above, an exemplary flow of a process in a case where the actor 2 acquires the content attribute in real time when using the content is illustrated.

First, the actor 2 accesses the content verifiable attribute issuing unit 40 through some kind of leading path when using the content (S31). The content verifiable attribute issuing unit 40 determines whether or not an issuance condition for the content attribute is satisfied (S32) and confirms whether or not the issuance condition is achieved by some action or the like by the actor 2 (S33, S34). Note that the action or the like here is, for example, payment, information presentation, or the like, but a process relating to the action does not necessarily need to be included in the content verifiable attribute issuing unit 40 and may be performed in a cooperating external system or service.

When the issuance condition for the content attribute is achieved, the actor 2 requests the content verifiable attribute issuing unit 40 to acquire the content attribute (S35). The request includes the actor identifier (DID) and the actor public key. Thereafter, the content verifiable attribute issuing unit 40 requests the digital content management unit 50 to acquire the content attribute (S36), and the digital content management unit 50 transmits the content attribute (a ticket number, for example) (S37). Note that the request for the content attribute to the digital content management unit 50 may be made every time the actor 2 uses the content as in the example in FIG. 9, or the content attribute may be requested and acquired in advance.

Thereafter, the content verifiable attribute issuing unit 40 attaches an electronic signature to an information set of the actor identifier (DID) and the actor public key passed from the actor 2, and the content attribute (ticket number or the like) acquired from the digital content management unit 50, with the content issuer private key held by the content verifiable attribute issuing unit 40 (S38), and returns the signed information set to the actor 2 as a verifiable signed content attribute (S39). The actor 2 requests the actor identifier management unit 10 to save the acquired signed content attribute (S40), and the actor identifier management unit 10 saves the requested signed content attribute (S41).

Processing Flow (Content Operation)

Figure 10:
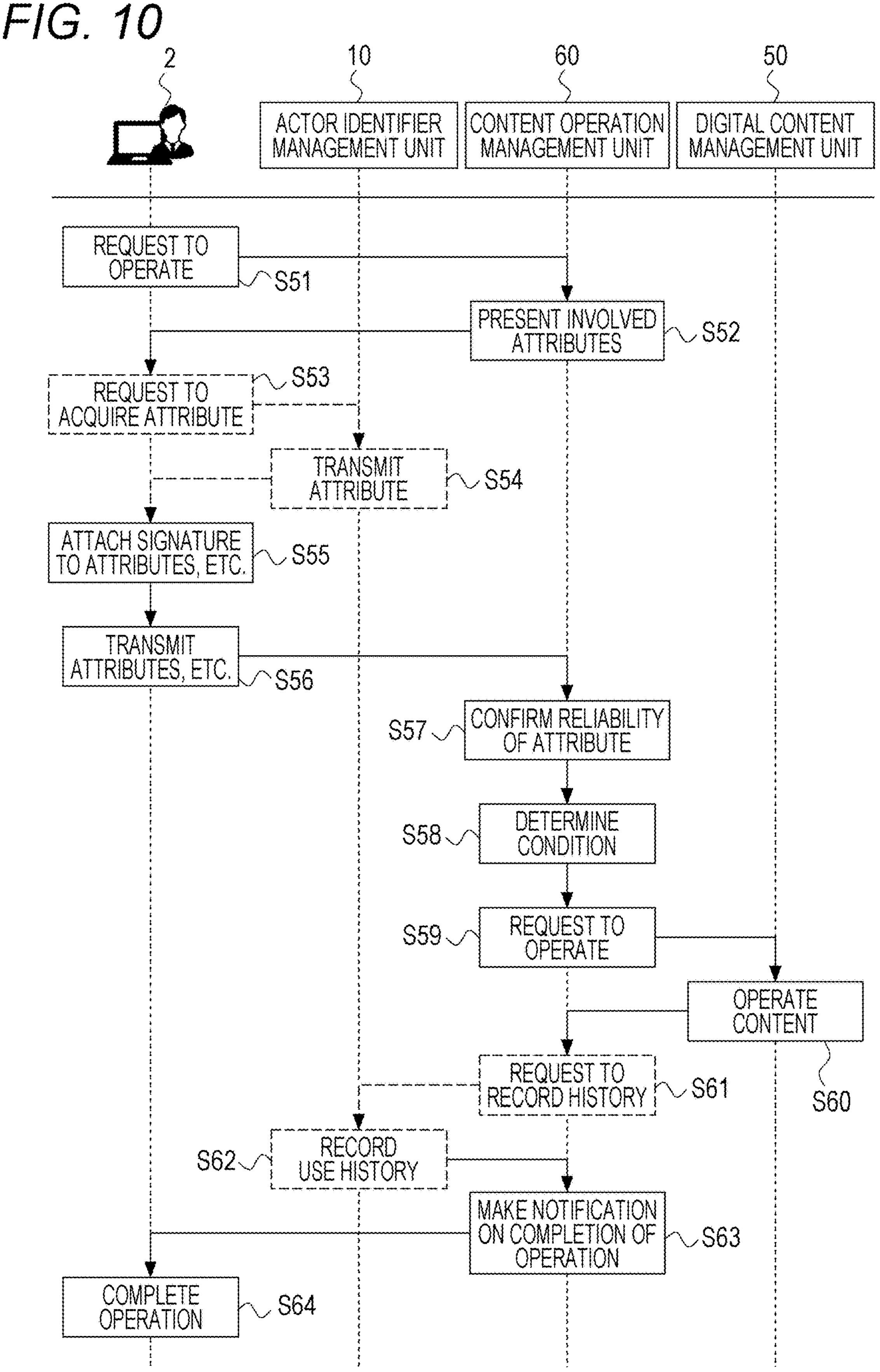
FIG. 10 is a diagram illustrating an outline of an exemplary flow of a content operation process in an operation phase according to an embodiment of the present invention.

FIG. 10 is a diagram illustrating an outline of an exemplary flow of a content operation process in the operation phase according to an embodiment of the present invention. First, the actor 2 accesses the content operation management unit 60 and requests to use or operate the content (S51). The content operation management unit 60 that has accepted the request presents the actor attribute and the content attribute involved in operating the content (S52).

In a case where there is an attribute that is not kept in the terminal of the actor 2 among the presented attributes, the actor 2 requests the actor identifier management unit 10 to acquire that attribute (S53). The actor identifier management unit 10 retrieves the attribute information already acquired and stored in the issue phase and transmits the retrieved attribute information to the actor 2 (S54). Note that, in a case where the involved actor attribute has not been acquired and is not stored in the actor identifier management unit 10, the actor attribute may be separately acquired by the process illustrated in the example in FIG. 7 described above.

When acquiring the involved attribute information, the actor 2 attaches an electronic signature to information including the actor identifier (DID) and the actor public key, an information set of the involved actor attribute, and an information set of the involved content attribute, with the actor private key held by the actor 2 (S55), and transmits the signed information to the content operation management unit 60 (S56).

The content operation management unit 60 first confirms the reliability of the acquired attribute information (S57). Specifically, first, for the entire attribute information transmitted from the actor 2, the electronic signature is verified with the actor public key included in the attribute information, for example. In a case where the verification is successful, it is further checked whether or not values match one another between the actor identifier and the actor public key included in the attribute information, the actor identifier and the actor public key included in the information set of the actor attribute, and the actor identifier and the actor public key included in the information set of the content attribute. As a result, it is confirmed that the acquired attribute information has been acquired by the legitimate actor 2 and has been transmitted as intended.

Furthermore, for the information set of the actor attribute, the electronic signature is verified with the actor issuer public key, and in a case where the verification is successful, it is confirmed, if allowed, that the expiration date set in the actor attribute has not expired, as necessary. Note that the actor issuer public key used to verify the electronic signature is acquired from the actor verifiable attribute issuing unit 20 relating to the concerned actor attribute (may be acquired in advance). Similarly, also for the information set of the content attribute, the electronic signature is verified with the content issuer public key, and in a case where the verification is successful, it is confirmed, if allowed, that the expiration date set in the content attribute has not expired, as necessary. Note that the content issuer public key used to verify the electronic signature is acquired from the content verifiable attribute issuing unit 40 (may be acquired in advance).

When the reliability of the attribute information can be confirmed, it is determined whether or not the use condition for the content is satisfied, on the basis of the contents of the actor attribute and the content attribute (S58). Note that, in determining the use condition, any other process may be incorporated and executed. In a case where the actor attribute and the content attribute satisfy the use condition, the digital content management unit 50 is requested to operate the content relating to the content attribute (a content number, for example) (S59), and the digital content management unit 50 executes the operation relating to the relevant content (S60).

When the content is operated, the content operation management unit 60 may request the actor identifier management unit 10 to record the use of the information on the actor attribute and the content attribute as a history (S61), and the actor identifier management unit 10 may record the use history of the attribute information in a database or the like. Then, the content operation management unit 60 notifies the actor 2 that the operation of the content has been completed (S63), and the actor 2 completes the use and operation of the content by receiving the notification (S64).

Figure 11:
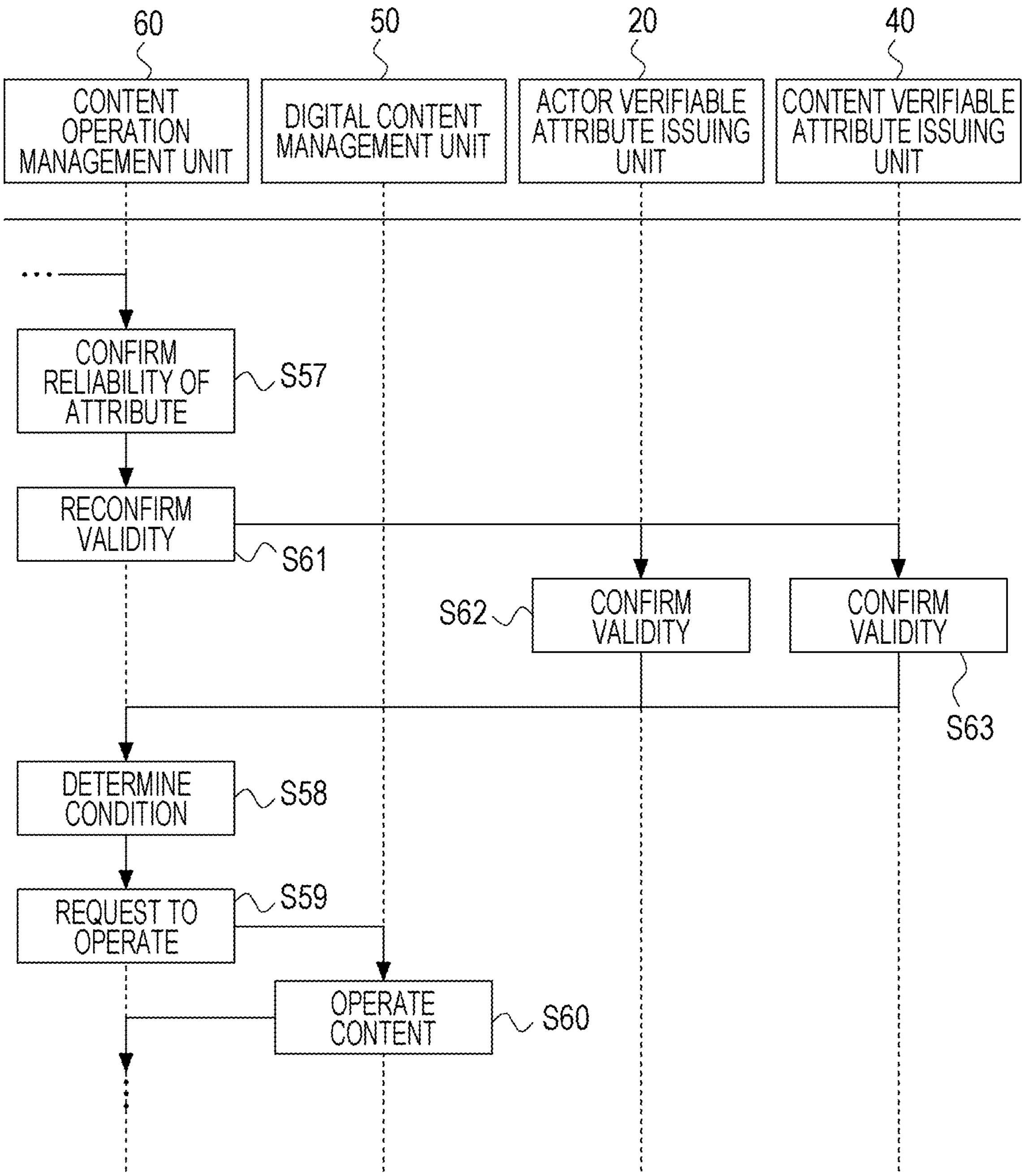
FIG. 11 is a diagram illustrating an outline of another exemplary flow of the content operation process in the operation phase according to an embodiment of the present invention.

FIG. 11 is a diagram illustrating an outline of another exemplary flow of the content operation process in the operation phase according to an embodiment of the present invention. In a processing flow similar to the example in FIG. 10 described above (in the drawing, only steps S57 to S60 in the example in FIG. 10 are excerpted and displayed), the example in FIG. 11 illustrates an example of a case where, after confirming the reliability of the attribute information (S57), the content operation management unit 60 inquires of the issuer and reconfirms the validity of the acquired actor attribute and content attribute every time, before determining whether or not the use condition for the content is satisfied for the obtained actor attribute and content attribute (S58).

In the process of reconfirming the validity of the actor attribute and the content attribute, the relevant actor verifiable attribute issuing unit 20 and content verifiable attribute issuing unit 40 are requested to reconfirm the validity of the actor attribute and the content attribute of which the reliability has been confirmed in step S57, respectively, on the basis of uniform resource locators (URLs) of contacts for inquiry and key information specifying the attribute information on each of the actor attribute and the content attribute, both included in the actor attribute and the content attribute (S61).

The actor verifiable attribute issuing unit 20 and the content verifiable attribute issuing unit 40 confirm again whether or not the contents of the actor attribute and the content attribute are valid, respectively (S62, S63). For example, by cooperating with the actor attribute management unit 30 and the digital content management unit 50 through an application programming interface (API), the validity of the latest cross section of the actor attribute and the content attribute can be confirmed. As a result, for example, even in a case where the actor attribute or the content attribute acquired in advance is valid at that time but is no longer valid at the time of the operation of the content, such as a case where the relevant actor 2 has left the company immediately before the operation of the content and the employee number is no longer valid, the use of the content can be appropriately restricted.

As described above, according to the digital content management system 1 that is an embodiment of the present invention, flexible and interoperable use of content can be implemented by separately managing verifiable attributes for the actor and the content severally.

That is, by separating the processes and functions between the actor side and the content side with the actor 2 as an axis, it is possible to cope with problems such as restrictions relating to a difference in network requirements when the actor 2 accesses both sides. In addition, since the actor verifiable attribute issuing unit 20 issues the signed actor attribute in advance, inquiry about and authentication of the actor attribute every time the content is used is no longer involved. This makes it possible to cope with a problem of complication and an increase in load caused by accessing a plurality of external systems in order to examine a use condition for the content. In addition, even in a case where the actor 2 is not reliable, the content operation management unit 60 verifies the actor attribute and the content attribute to confirm the reliability of the information and confirms that the actor 2 has appropriate authority. This makes it possible to cope with a problem that whether or not the content has been distributed to the user as intended and has been used as intended is not allowed to be examined.

While an aspect of the invention made by the present inventors has been specifically described on the basis of the embodiments, the present invention is not limited to the embodiments described above, and it goes without saying that modifications may be variously made without departing from the gist of the present invention. The embodiments above have been described in detail to explain the present invention in an easy-to-understand manner and are not necessarily limited to the embodiments including all the components described. Another component may be added to, deleted from, or replaced with a part of the configuration of each embodiment described above.

Some or all of the components, functions, processing units, processing procedures, and the like described above each may be implemented by hardware being designed as an integrated circuit, for example. Alternatively, the components, functions, and the like described above each may be implemented by software by a processor interpreting and executing a program for implementing its function. Information such as programs, tables, and files for implementing each function may be stored in a recording device such as a memory, a hard disk, or an SSD, or in a recording medium such as an integrated circuit (IC) card, a secure digital (SD) card, or a digital versatile disc (DVD).

Each of the drawings mentioned above illustrates control lines and information lines considered to be necessary for the description and does not necessarily illustrate all the control lines and information lines supposed to be carried out. It may be considered that almost all the components are mutually coupled in practice.

The present invention can be used for a digital content management system that manages diverse kinds of content including content only representing rights.

What is claimed is:

1. A digital content management system configured to manage an operation on digital content by an actor, the digital content management system comprising:

a processor; and a memory storing instructions, that when executed by the processor, causes the processor to perform:

holding a pair of a first public key and a first private key, acquiring attribute information regarding the actor, giving a first electronic signature to the acquired attribute information with the first private key, and issuing the attribute information given the first electronic signature, as a signed actor attribute;

holding a pair of a second public key and a second private key, acquiring attribute information regarding the digital content, giving a second electronic signature to the acquired attribute information with the second private key, and issuing the attribute information given the second electronic signature, as a signed content attribute;

issuing an actor identifier that identifies the actor, and a pair of a third public key and a third private key, and holding the signed actor attribute and the signed content attribute; and upon a request to operate the digital content from the actor with information to which a third electronic signature has been given with the third private key and that includes the actor identifier, the third public key, the signed actor attribute, and the signed content attribute, verifying the third electronic signature with the third public key, verifying the first electronic signature given to the signed actor attribute with the first public key acquired from the actor verifiable attribute issuing unit, verifying the second electronic signature given to the signed content attribute with the second public key acquired from the content verifiable attribute issuing unit, and determining satisfaction of a use condition for the digital content, based on the verified signed actor attribute and signed content attribute.

2. The digital content management system according to claim 1, wherein the signed actor attribute and the signed content attribute each include the actor identifier and the third public key, and the instructions, when executed by the processor, causes the processor to further perform confirming that the actor identifier and the third public key included in the information match values of the actor identifier and the third public key included in each of the signed actor attribute and the signed content attribute.

3. The digital content management system according to claim 1, wherein the instructions, when executed by the processor, causes the processor to further perform confirming that an expiration date has not expired for each of the verified signed actor attribute and signed content attribute.

4. The digital content management system according to claim 1, wherein the instructions, when executed by the processor, causes the processor to further perform reconfirming that the attribute information is valid for each of the verified signed actor attribute and signed content attribute.

* * * * *